United States Patent
Ruping

(10) Patent No.: US 7,661,056 B2
(45) Date of Patent: Feb. 9, 2010

(54) CIRCUIT ARRANGEMENT FOR PROCESSING DATA

(75) Inventor: Stefan Ruping, Lengdorf (DE)

(73) Assignee: Infineon Technologies AG (DE)

( * ) Notice: Subject to any disclaimer, the term of this patent is extended or adjusted under 35 U.S.C. 154(b) by 535 days.

(21) Appl. No.: 11/213,663

(22) Filed: Aug. 25, 2005

(65) Prior Publication Data

US 2006/0048040 A1 Mar. 2, 2006

(30) Foreign Application Priority Data

Aug. 27, 2004 (DE) ...................... 10 2004 041 657

(51) Int. Cl.
*G11C 29/00* (2006.01)
(52) U.S. Cl. ........................ 714/763; 714/766; 714/718
(58) Field of Classification Search .................. 714/763, 714/766
See application file for complete search history.

(56) References Cited

U.S. PATENT DOCUMENTS

| | | | | |
|---|---|---|---|---|
| 4,672,609 A * | 6/1987 | Humphrey et al. | ........... | 714/719 |
| 4,862,462 A * | 8/1989 | Zulian | ........................ | 714/758 |
| 4,939,694 A * | 7/1990 | Eaton et al. | .................. | 365/200 |
| 5,138,619 A * | 8/1992 | Fasang et al. | ................ | 714/718 |
| 5,563,833 A * | 10/1996 | Adams et al. | ................ | 365/201 |
| 5,581,762 A * | 12/1996 | Hayashi et al. | ............. | 717/144 |
| 5,617,429 A * | 4/1997 | Goto | .......................... | 714/736 |
| 5,617,531 A * | 4/1997 | Crouch et al. | .................. | 714/30 |
| 5,689,466 A * | 11/1997 | Qureshi | ...................... | 365/201 |
| 5,740,098 A * | 4/1998 | Adams et al. | .............. | 365/49.1 |
| 5,751,932 A | 5/1998 | Horst et al. | | |
| 5,752,010 A * | 5/1998 | Herbert | ....................... | 345/546 |
| 5,825,785 A * | 10/1998 | Barry et al. | .................. | 714/732 |
| 5,936,876 A * | 8/1999 | Sugasawara | ................ | 365/51 |
| 5,946,247 A * | 8/1999 | Osawa et al. | ................. | 365/201 |
| 5,995,424 A * | 11/1999 | Lawrence et al. | ........... | 365/201 |
| 6,081,910 A * | 6/2000 | Mifsud et al. | ............... | 714/718 |
| 6,310,807 B1 * | 10/2001 | Ooishi et al. | ................. | 365/200 |
| 6,360,342 B1 * | 3/2002 | Lee et al. | ..................... | 714/718 |
| 6,587,979 B1 * | 7/2003 | Kraus et al. | .................. | 714/720 |
| 6,725,403 B1 * | 4/2004 | Schmoelz | .................... | 714/723 |
| 6,728,910 B1 * | 4/2004 | Huang | ........................ | 714/711 |
| 7,100,097 B2 * | 8/2006 | Patella et al. | ................. | 714/718 |

\* cited by examiner

*Primary Examiner*—M. Mujtaba K Chaudry
(74) *Attorney, Agent, or Firm*—Dickstein, Shapiro, LLP.

(57) ABSTRACT

Circuit arrangement including an encoding unit having a first input for receiving an address word and a second input for receiving a data word and a check word, wherein the encoding unit outputs an alarm signal if the check word does not correspond to at least the address word or the data word.

11 Claims, 1 Drawing Sheet

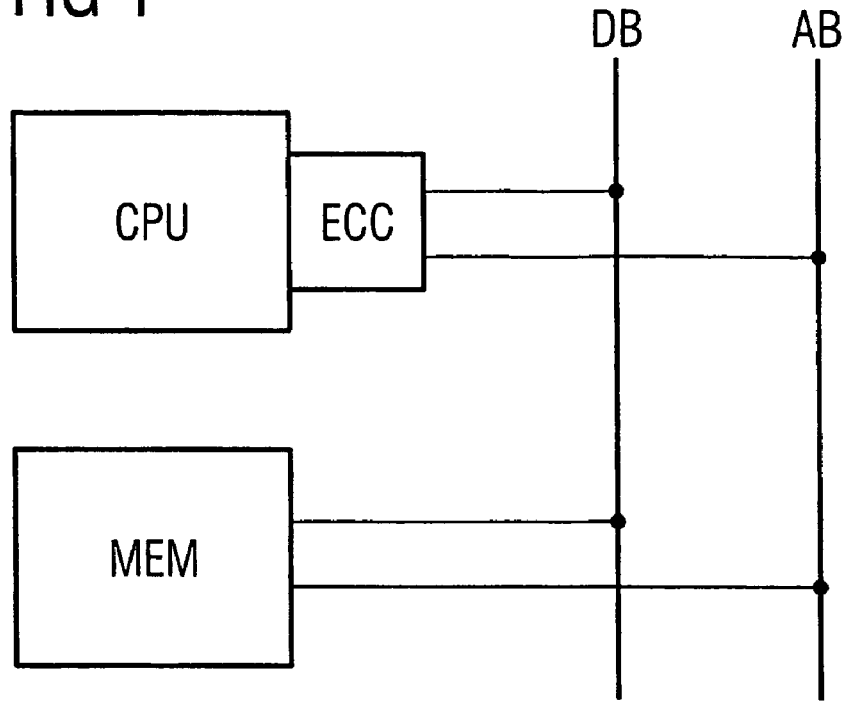
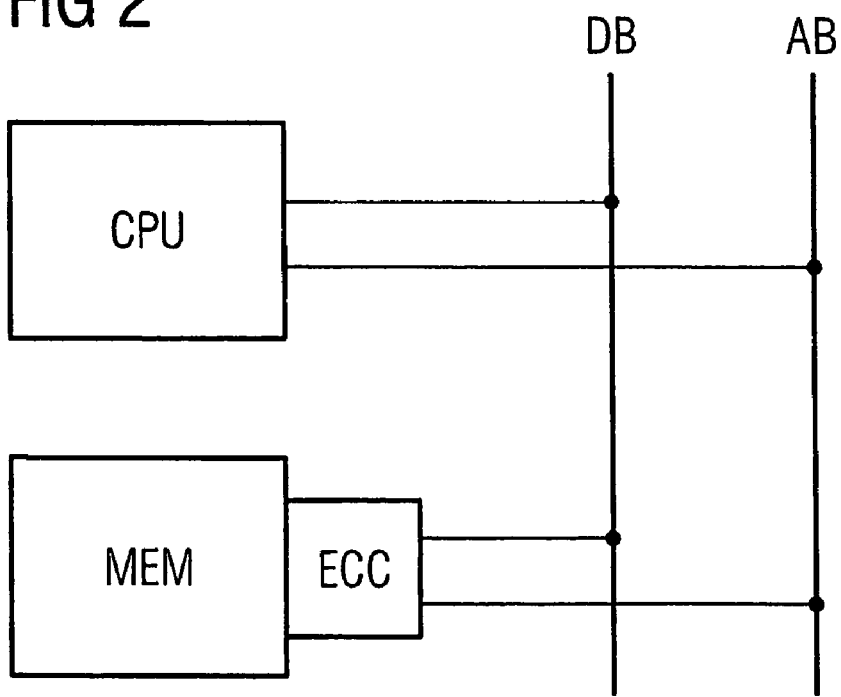

CIRCUIT ARRANGEMENT FOR PROCESSING DATA

CROSS-REFERENCE TO RELATED APPLICATION

This application claims priority to German Patent Application Serial No. 102004041657.5, which was filed on Aug. 27, 2004 and is incorporated herein by reference in its entirety.

FIELD OF THE INVENTION

The present invention relates to a circuit arrangement for processing data.

BACKGROUND OF THE INVENTION

A circuit arrangement for processing data essentially comprises a memory and an arithmetic logic unit. A data word is stored at an address in the memory. In order for it to be possible to process a data word in the arithmetic logic unit, the data word must be loaded into the arithmetic logic unit from the memory. After an address which was generated by the arithmetic logic unit has been transmitted to the memory, the data word stored at the corresponding location is loaded into the arithmetic logic unit from the memory. An address bus and a data bus, to which the arithmetic logic unit and the memory are coupled, are usually provided for the purpose of transmitting addresses and data.

One possible way of protecting the data in the memory area from accidental data changes and deliberate manipulation is to use redundant information about each data word, which information is stored together with the latter at the same address.

The redundant information is generally in the form of a check word and comprises a plurality of bits which are generated, for example, during error-identifying encoding and are stored together with the data word. The simplest form of error-identifying encoding is an additional parity bit that provides information about whether a data word contains an even or odd number of one of the two bit states. This makes it possible to identify an odd number of errors but without being able to locate the errors within the data word.

Providing further check bits and using suitable error-identifying encoding make it possible to improve the accuracy of error identification.

When using so-called error-correcting codes, it is also possible to locate these errors and also correct them by inverting the relevant bits. To this end, a check word is generated again from the data word and its deviation from the check word that is already present can be used to infer the errors and their position.

Error-correcting encoding has hitherto been used in circuit arrangements only to detect defective data in the memory. To this end, the data word requested by the arithmetic logic unit together with the corresponding check word in the memory are checked for errors by an encoding unit. Any possible errors may be indicated or, when using error-correcting encoding, may be corrected before being loaded into the arithmetic logic unit.

The disadvantage of this refinement that has been used hitherto is that it is used to protect only the memory (by detection and error correction) from the effects of possible manipulation.

SUMMARY OF THE INVENTION

An object of the present invention is to use a suitable circuit arrangement to detect data manipulation both in the memory and on the data and address buses.

The circuit arrangement comprises an encoding unit having a first input for receiving an address word and a second input for receiving a data word and a check word, wherein the encoding unit outputs an alarm signal if the check word does not correspond to at least the address word or the data word.

BRIEF DESCRIPTION OF THE DRAWINGS

The invention is explained below using exemplary embodiments and with reference to the drawing, in which:

FIG. 1 shows a block diagram of a first embodiment of the circuit arrangement of the present invention; and FIG. 2 shows a block diagram of a second embodiment of the circuit arrangement of the present invention.

DETAILED DESCRIPTION OF PREFERRED EMBODIMENTS OF THE INVENTION

The circuit arrangement comprises an encoding unit which, for its part, has first inputs for applying an address word and second inputs for applying a data word and a check word. The encoding unit is designed to output an alarm signal if the check word does not correspond to at least the address word or the data word.

The encoding unit is advantageously designed to output a corrected data word from the address word, the data word and the check word if the check word does not correspond to the data word. This results in the circuit operating correctly even in the case of data words which have been manipulated.

In a further development, the encoding unit is designed to output a check word which corresponds to an address word that is applied on the input side and to a data word that is applied on the input side. In addition to checking the check word, this also makes it possible to generate the latter.

The encoding unit is coupled between an arithmetic logic unit and a memory. This makes it possible to tap off and check the address and data words transferred between these two units.

In an advantageous design, the encoding unit is connected upstream of the arithmetic logic unit and is connected to the memory via a data bus and an address bus. This refinement of the circuit arrangement makes it possible to detect data manipulation on the way from the memory to the arithmetic logic unit.

In an alternative refinement, the encoding unit is connected upstream of the memory and is connected to the arithmetic logic unit via a data bus and an address bus. This means that, as early as in the memory and before the data are loaded into the arithmetic logic unit, a check is carried out to determine whether the data correspond to the requested address.

It is also conceivable, of course, for only one bus to be provided in the circuit arrangement, the bus being used to transmit data and addresses. The abovementioned possible ways of positioning the encoding unit remain unaffected by this and only its configuration may be adapted, for example by coupling the first and second inputs for applying an address word and a data word, if a distinction is made between the presence of the address word and the presence of the data word on the bus.

The object is likewise achieved by means of an inventive method for checking a data word and an address word which is associated with the latter. The method comprises the provision of the address word, the provision of the data word, the provision of a check word, the checking of the correspondence between the check word and at least the data word and the address word, and the performance of an alarm action if the check word does not correspond to the address word and the data word.

In an advantageous refinement of the method, the check word is generated from the address word and the data word on the basis of error-identifying encoding, this encoding being suitable for indicating at least one change to the address word or the data word.

In a further development of the inventive method, the check word is generated from the previously provided address word and the previously provided data word on the basis of error-correcting encoding, the encoding being suitable for correcting at least one change to the address word or the data word.

A corrected data word can be generated from this check word which has been generated in this manner, with the result that operation of the circuit arrangement is not impaired despite manipulation.

FIG. 1 illustrates a circuit arrangement having an arithmetic logic unit CPU and a memory MEM. An encoding unit ECC is connected upstream of the arithmetic logic unit CPU, the latter being connected to a data bus DB and an address bus AB via the encoding unit. The memory MEM is likewise connected to the data bus DB and the address bus AB.

In order to load a data word from the memory MEM, the arithmetic logic unit CPU transmits an address word to the memory MEM via the address bus AB, the address word specifying the address at which a requested data word is stored in the memory MEM.

The data word stored at the corresponding address is passed to the data bus DB together with the check word which is likewise stored there. Alternatively, the check word can also be stored at another location in the memory MEM. The encoding unit ECC checks the address word that is applied on the input side and the data word that is applied, via the data bus DB, on the input side and the applied check word to determine whether the check word corresponds to at least the data word or the address word.

If this correspondence exists, the arithmetic logic unit CPU can process the data word in the desired manner. If this correspondence does not exist, an alarm signal is output.

The simplest way of checking whether an error has occurred is to calculate a new check word from the data word and the address word and to check whether the calculated check word corresponds to the applied check word. The check word or its deviation from the newly calculated check word can also be used to infer whether an error has occurred in the address word or the data word.

In addition to a simple error message, the reactions of the circuit arrangement to the alarm signal may also comprise deactivation of the circuit arrangement or a change into a defined initial state, which is also referred to as reset.

When detecting an error in the data word alone and when using an error-correcting code, a suitable reaction is to correct this error in the data word in order to make it possible for the circuit to operate in a trouble-free manner. This correction is advantageously accompanied by the outputting of an error message in order to indicate and log the data manipulation.

It is generally not expedient to correct the address word since it is to be assumed that an undesired data word has been loaded from an incorrect address. In addition to outputting an error message, a suitable reaction in this case would be to reload the data.

When a data word from the arithmetic logic unit CPU is being stored in the memory MEM, the encoding unit ECC can also be used to generate a check word from the address word (which has been generated by the arithmetic logic unit CPU) for the data word that is present in the arithmetic logic unit and the data word. The data word and the check word that has been generated are transmitted to the memory MEM via the data bus DB and are stored at the appropriate location in the memory in accordance with the address word which is transmitted via the address bus AB. If the address word or data word is manipulated during this operation, an error which stems from the previous attack during the storage operation is indicated when the corresponding data word is reloaded into the arithmetic logic unit CPU even if there is no data manipulation in this case.

FIG. 2 illustrates an alternative embodiment of the circuit arrangement. Only the differences from the circuit arrangement in FIG. 1 will be described and explained below.

In FIG. 2, in contrast to FIG. 1, the encoding unit ECC is connected upstream of the memory MEM and is coupled to the arithmetic logic unit CPU via the data bus DB and the address bus AB.

When a data word is being loaded into the arithmetic logic unit CPU, the encoding unit ECC checks whether the address word applied to the address bus AB and the data word stored at the corresponding location in the memory MEM correspond to the check word which is likewise stored there. Even if this is the case, it is not possible, in this alternative embodiment of the circuit arrangement, to detect manipulation of the data word when it is being transmitted to the arithmetic logic unit CPU via the data bus DB.

If the encoding unit has detected that the check word does not correspond to at least the data word or the address word, an alarm signal is output. The reactions of the circuit arrangement to this may be of a similar nature to those already described for the embodiment shown in FIG. 1.

When a data word from the arithmetic logic unit CPU is being stored in the memory MEM, the encoding unit ECC may also be used to generate the check word. It should be noted that data manipulation or address manipulation carried out on the way from the arithmetic logic unit CPU to the memory MEM leads to a check word that does not correspond to the original data and address words.

Even if errors on the data or address bus can be detected only insufficiently in this embodiment of the circuit arrangement, this circuit arrangement can be used, when detecting errors in the address word, to infer an attack between the encoding unit ECC and the memory MEM or an impairment in the operation of the memory MEM.

What is claimed is:

1. A circuit arrangement comprising an encoding unit having a first input configured to receive an address word and a second input configured to receive a data word and a check word, wherein the encoding unit outputs an alarm signal if the check word does not correspond to at least the address word or the data word.

2. The circuit arrangement of claim 1, wherein the encoding unit outputs a corrected data word from the address word, the data word, and the check word if the check word does not correspond to the address word and/or the data word.

3. The circuit arrangement of claim 1, wherein the encoding unit outputs a check word which corresponds to the received address word and to the received data word.

4. The circuit arrangement of claim 1, further comprising an arithmetic logic unit and a memory, wherein the encoding unit is coupled between the arithmetic logic unit and the memory.

5. The circuit arrangement of claim 4, wherein the encoding unit is coupled to the arithmetic logic unit via a data bus and an address bus.

6. The circuit arrangement of claim 4, wherein the encoding unit is coupled to the memory via a data bus and an address bus.

7. A method for checking a data word and an address word which is associated with the data word, the method comprising:
   providing the address word;
   providing the data word;
   providing a check word;
   checking correspondence between the check word and at least the data word or the address word; and
   generating a corrected data word from the check word, the data word, and the address word if the check word does not correspond do the address word or the data word.

8. The method of claim 7, wherein the check word is generated from the address word and the data word based on error-identifying encoding, the encoding being suitable for indicating at least one change to the address word or the data word.

9. The method of claim 7, wherein the check word is generated from the previously provided address word and the previously provided data word based on error-correcting encoding, the encoding being suitable for correcting at least one change to the address word or the data word.

10. A circuit arrangement comprising an encoding means having a first input for receiving an address word and a second input for receiving a data word and a check word, wherein the encoding means outputs an alarm signal if the check word does not correspond to at least the address word or the data word.

11. A system for checking a data word and an address word which is associated with the data word, the system comprising:
   means for providing the address word;
   means for providing the data word;
   means for providing a check word;
   means for checking correspondence between the check word and at least the data word or the address word; and
   means for generating a corrected data word from the check word, the data word, and the address word if the check word does not correspond to the address word or the data word.

* * * * *